(12) United States Patent
Chu

(10) Patent No.: US 6,520,690 B2
(45) Date of Patent: Feb. 18, 2003

(54) CAR DOOR REARVIEW MIRROR STRUCTURE

(76) Inventor: Li-Tsan Chu, 2 Floor, No.15, Lane 81, Kwuang-Fu S. Rd., Taipei (TW)

( * ) Notice: Subject to any disclaimer, the term of this patent is extended or adjusted under 35 U.S.C. 154(b) by 0 days.

(21) Appl. No.: 09/738,164

(22) Filed: Dec. 13, 2000

(65) Prior Publication Data

US 2002/0071676 A1 Jun. 13, 2002

(51) Int. Cl.7 .......................... G03B 17/00; G03B 17/48
(52) U.S. Cl. ...................... 396/419; 396/428; 396/429; 340/457; 340/461; 359/839
(58) Field of Search .................................. 396/419, 428, 396/429; 340/457, 461; 348/148; 359/839

(56) References Cited

U.S. PATENT DOCUMENTS 6,124,886 A * 9/2000 DeLine et al. .............. 340/433

FOREIGN PATENT DOCUMENTS

| JP | 2000-62531 | * | 2/2000 |
| JP | 2000-85474 | * | 3/2000 |
| JP | 2000-185597 | * | 7/2000 |

* cited by examiner

*Primary Examiner*—D Rutledge
(74) *Attorney, Agent, or Firm*—Troxell Law Office PLLC

(57) ABSTRACT

A car door rearview mirror structure having a mirror disposed on a rear side of the main body of the rearview mirror and electrically adjustable in inclination angle. A front cover body is mated with front side of the main body and a partitioning board is disposed in the main body to separate the front cover body from the mirror. A camera lens is disposed on the surface of front side of the partitioning board. The front face of the front cover body is formed with a window in front of the camera lens with a transparent cover fitted in the window to seal the window. By means of the camera lens and through the transparent cover, the view of a dead corner on a front side of the car is transmitted to a display arranged in the car so as to ensure driving safety.

5 Claims, 4 Drawing Sheets

CAR DOOR REARVIEW MIRROR STRUCTURE

BACKGROUND OF THE INVENTION

The present invention is related to a car door rearview mirror structure in which a camera lens is disposed on front side of the rearview mirror. The inclination angle of the camera lens is adjustable, whereby the view of dead corner on front side of the car is transmitted to a display arranged in the car so as to ensure driving safety.

A modern car is more and more widely equipped with various kinds of automatic equipment such as thermostat controller, refrigerator, electric seats, video/audio instruments (VCD, liquid crystal display), etc. On outer side of the car are disposed electric rearview mirror, head light-detective turning on system, parking alerting system, etc. However, when parking or starting the car, the parking alerting system can hardly truly detect and control the situation of the dead corner on outer side of the car. Furthermore, with the rearview mirrors on two sides of the car, a driver can hardly truly know whether there is any alien articles such as sharp articles, children, etc. on the dead corner. Therefore, the safety in driving can be hardly ensured. Therefore, it is necessary to provide an improved car-used rearview mirror which enables a driver to clearly see the view of dead corner on front side of the car so as to ensure driving safety.

SUMMARY OF THE INVENTION

It is therefore a primary object of the present invention to provide a car door rearview mirror structure. A camera lens is disposed in the main body of the rearview mirror and directed to front side, whereby the view of dead corner on front side of the car is transmitted to a display arranged in the car so as to ensure driving safety.

It is a further object of the present invention to provide the above rearview mirror in which the inclination angle of the camera can be freely adjusted as necessary, so that the camera lens can be adjusted to a most suitable shooting angle to meet the actual requirement of a driver.

According to the above objects, the car door rearview mirror structure of the present invention includes a main body, a mirror disposed on rear side of the main body and electrically adjustable in inclination angle and a front cover body mated with front side of the main body. A partitioning board is disposed in the main body to separate the front cover body from the mirror. A camera lens is disposed on a surface of front side of the partitioning board. The front face of the front cover body is formed with a window in front of the camera lens. A transparent cover is fitted in the window. By means of the camera lens, the view of dead corner on front side of the car is transmitted to a display arranged in the car so as to ensure driving safety.

An electric tilting mechanism is disposed between the camera lens and the partitioning board and fixed on the surface of the partitioning board. The camera lens is disposed on front side of the electric tilting mechanism, whereby by means of controlling the electric tilting mechanism, the shooting angle of the camera lens can be adjusted.

The present invention can be best understood through the following description and accompanying drawings wherein:

DETAILED DESCRIPTION OF THE PREFERRED EMBODIMENT

Figure 1:
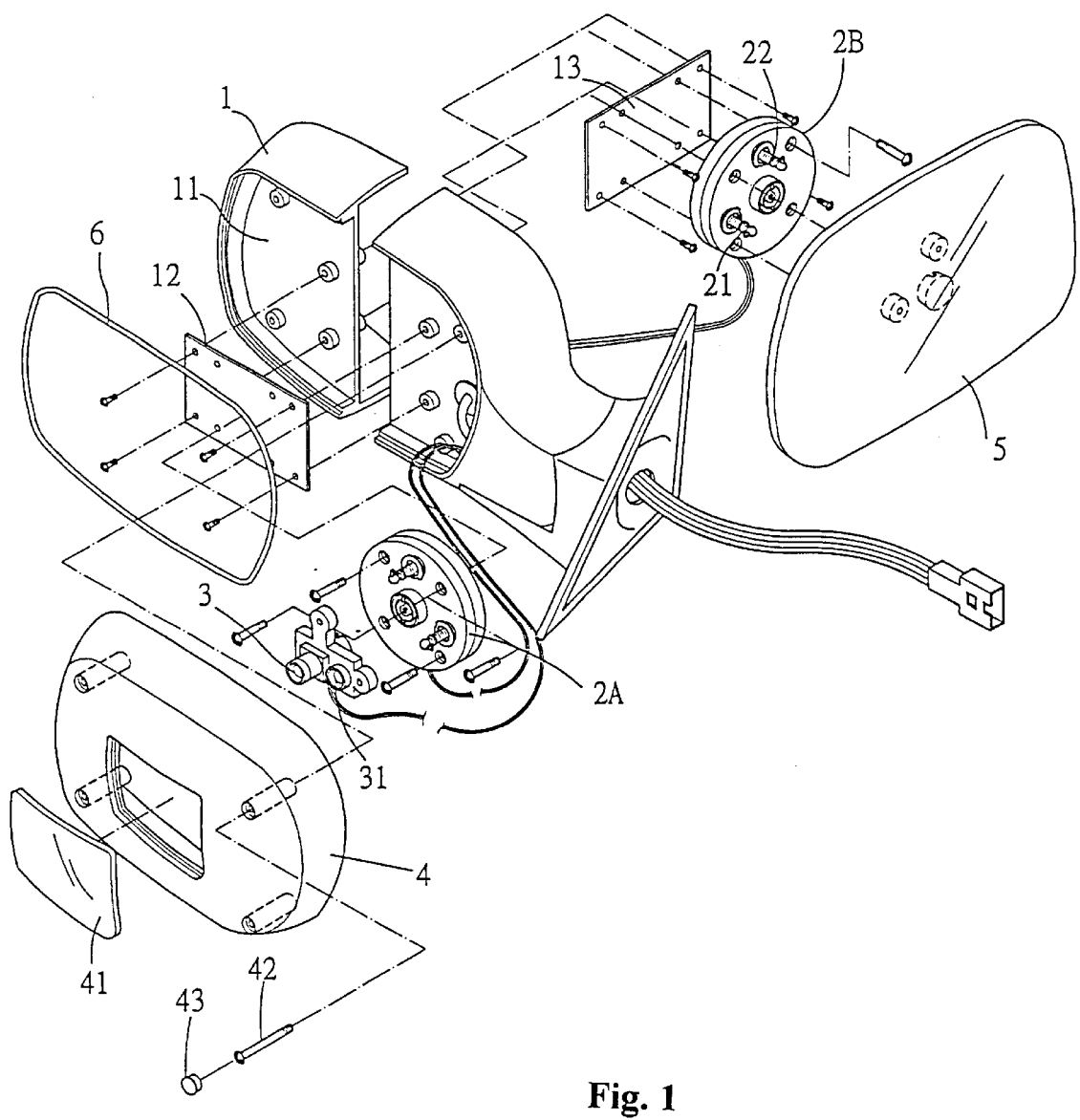
FIG. 1 is a perspective exploded view of the present invention.
Figure 2:
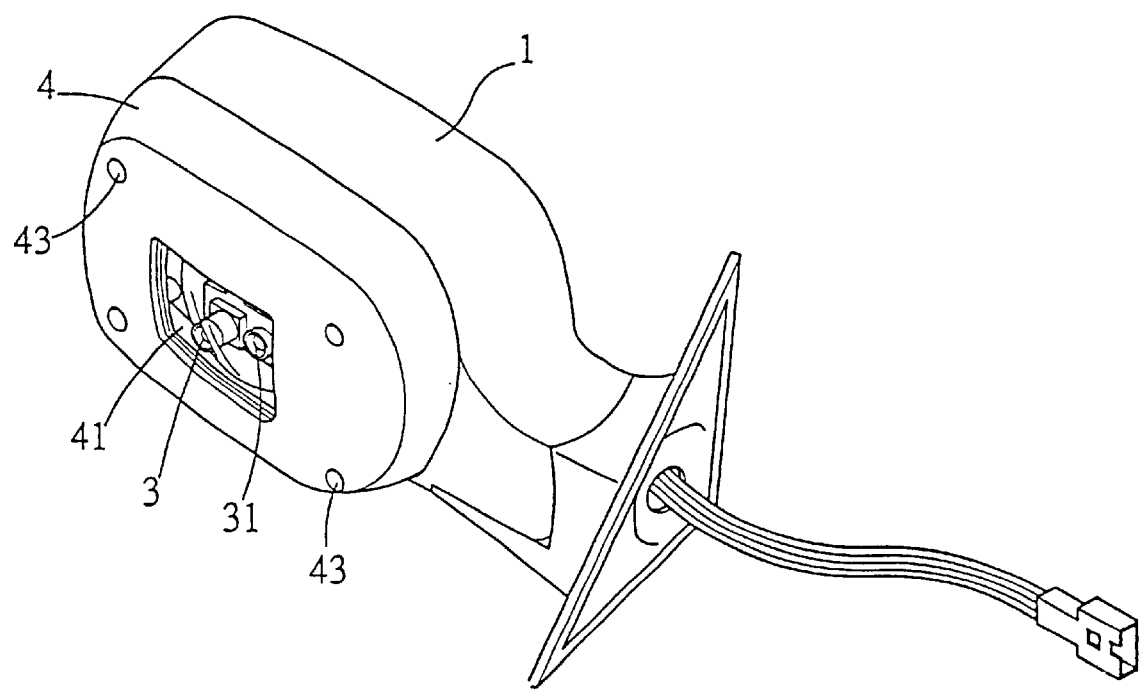
FIG. 2 is a perspective assembled view of the present invention.

Please refer to FIGS. 1 and 2. The car door rearview mirror structure of the present invention includes a main body 1 having a central partitioning board 11. The centers of the front and rear sides of the partitioning board 11 are respectively fixed with two fixing boards 12, 13. A first electric tilting mechanism 2B is fixed on the surface of the rear fixing board 13. A mirror 5 is mounted on the first electric tilting mechanism 2B. A second electric tilting mechanism 2A is fixed on the surface of the front fixing board 12. A camera lens 3 is disposed on the second electric tilting mechanism 2A. A front cover body 4 covers the front side of the main body.

Figure 3:
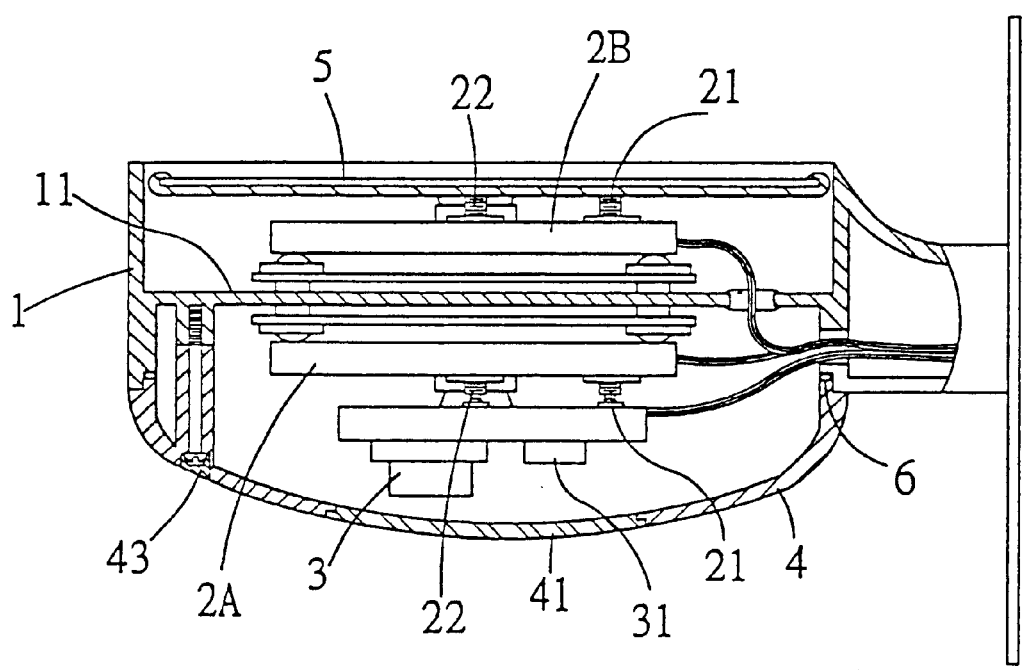
FIG. 3 is a sectional assembled view of the present invention.

Two motors are disposed in the second electric tilting mechanism 2A and the first electric tilting mechanism 2B. The motors cooperate with gears for respectively driving a horizontal thread rod 21 and vertical thread rod 22. A controlling button disposed in the car is connected to the rearview mirror for controlling the horizontal thread rod 21 and vertical thread rod 22 of the second electric tilting mechanism 2A and the first electric tilting mechanism 2B. Accordingly, the mirror 5 or the camera lens 3 can be adjusted to a suitable inclination angle (with reference to FIG. 3).

An airtight ring 6 is disposed along the mating peripheries of the front cover body 4 and the main body 11. The front cover body 4 is locked on the partitioning board 11 by screws 42. Then cocks 43 are fitted into the thread holes to airtightly seal the space in which the camera lens 3 is placed. In addition, the front face of the front cover body 4 is formed with a window in front of the camera lens 3. A transparent cover 41 is fitted in the window.

The signal of the camera lens 3 is transmitted to a display preset in the car, whereby the view of dead corner in front of the car can be seen in the display. In addition, a bulb 31 is arranged beside the camera lens 3 to provide auxiliary illumination for more clearly showing the view of the dead corner on front side.

Figure 4:
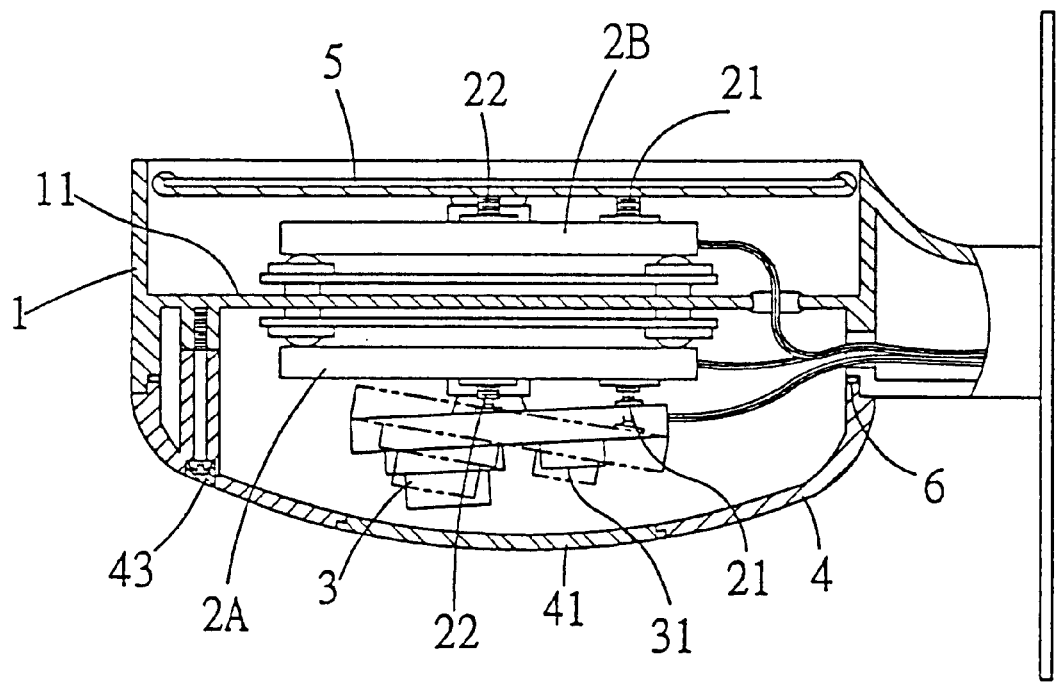
FIG. 4 is a view according to FIG. 3, showing the tilting operation of the camera lens of the present invention.

Referring to FIG. 4, by means of controlling the horizontal thread rod 21 or vertical thread rod 22 of the second electric tilting mechanism 2A, the camera lens 3 can be adjusted to a suitable shooting angle as necessary.

In conclusion, the camera lens is disposed in the electric rearview mirror of a car and directed to front side. By means of an electric tilting mechanism the same as the electric tilting mechanism for adjusting the mirror, the camera lens 3 can be adjusted to a suitable shooting angle. In addition, a bulb is integrally added onto the camera lens to provide auxiliary illumination for more clearly showing the view of the dead corner on front side.

The above embodiment is only used to illustrate the present invention, not intended to limit the scope thereof. Many modifications of the above embodiment can be made without departing from the spirit of the present invention.

What is claimed is:

1. A car door rearview mirror structure comprising a main body, a mirror disposed on a rear side of the main body and electrically adjustable in inclination angle, and a front cover body mated with a front side of the main body, said rearview mirror structure further including a partitioning board disposed in the main body to separate the front cover body from the mirror, a camera lens disposed on a surface of a front side of the partitioning board for shooting pictures towards a front side of the car for photographing a dead corner on a front side of the car to ensure driving safety, wherein an electric tilting mechanism is disposed between the camera lens and the partitioning board and fixed on the front side of the partitioning board, the camera lens being disposed on the electric tilting mechanism, whereby by means of controlling the electric tilting mechanism, a shooting angle of the camera lens can be adjusted.

2. The car door rearview mirror structure as claimed in claim 1, wherein a front face of the front cover body has a window in front of the camera lens, and a transparent cover fitted in the window to seal the window.

3. The car door rearview mirror structure as claimed in claim 1, wherein an airtight ring is disposed along mating peripheries of the front cover body and the main body for airtightly sealing a space in which the camera lens is placed.

4. A car door rearview mirror structure comprising a main body, a mirror disposed on a rear side of the main body and electrically adjustable in inclination angle, and a front cover body mated with a front side of the main body, said rearview mirror structure further including a partitioning board disposed in the main body to separate the front cover body from the mirror, a camera lens disposed on a surface of a front side of the partitioning board for shooting pictures towards a front side of the car for photographing a dead corner on a front side of the car so as to ensure driving safety, wherein an airtight ring is disposed along mating peripheries of the front cover body and the main body for airtightly sealing a space in which the camera lens is placed.

5. The car door rearview mirror structure as claimed in claim 4, wherein a front face of the front cover body has a window in front of the camera lens, and a transparent cover fitted in the window to seal the window.

* * * * *